US008884747B2

(12) United States Patent
Woo et al.

(10) Patent No.: US 8,884,747 B2
(45) Date of Patent: *Nov. 11, 2014

(54) HAPTIC FEEDBACK DEVICE AND ELECTRONIC DEVICE

(75) Inventors: Ki Suk Woo, Seoul (KR); Dae Woong Yun, Incheon (KR); Su Young Jung, Gyunggi-do (KR); Yeon Ho Son, Gyunggi-do (KR); Dong Sun Park, Seoul (KR); Kum Kyung Lee, Gyunggi-do (KR); Ji Yeoun Jang, Gyunggi-do (KR); Chang Soo Kim, Gyunggi-do (KR); Jae Kyung Kim, Gyunggi-do (KR)

(73) Assignee: Samsung Electro-Mechanics Co., Ltd., Suwon (KR)

(*) Notice: Subject to any disclaimer, the term of this patent is extended or adjusted under 35 U.S.C. 154(b) by 992 days.

This patent is subject to a terminal disclaimer.

(21) Appl. No.: 12/926,597

(22) Filed: Nov. 29, 2010

(65) Prior Publication Data

US 2011/0260843 A1 Oct. 27, 2011

(30) Foreign Application Priority Data

Apr. 22, 2010 (KR) .......................... 10-2010-0037519

(51) Int. Cl.
*G08B 6/00* (2006.01)
*G06F 3/041* (2006.01)
*G06F 3/01* (2006.01)
(52) U.S. Cl.
CPC ................ *G06F 3/016* (2013.01); *G06F 3/041* (2013.01)
USPC .................... 340/407.2; 340/407.1; 340/4.12; 340/691.7; 340/582; 345/173; 345/177
(58) Field of Classification Search
USPC ..................... 340/407.1–407.2; 345/177, 173
See application file for complete search history.

(56) References Cited

U.S. PATENT DOCUMENTS

| 7,215,329 | B2* | 5/2007 | Yoshikawa et al. ........... 345/173 |
| 7,400,319 | B2* | 7/2008 | Nakayama et al. ........... 345/177 |
| 7,755,607 | B2* | 7/2010 | Poupyrev et al. ............. 345/156 |
| 2002/0149561 | A1* | 10/2002 | Fukumoto et al. ............ 345/156 |
| 2010/0117809 | A1* | 5/2010 | Dai et al. .................... 340/407.2 |
| 2010/0250071 | A1* | 9/2010 | Pala et al. ....................... 701/48 |
| 2011/0032091 | A1* | 2/2011 | Park et al. .................. 340/407.2 |
| 2011/0148608 | A1* | 6/2011 | Grant et al. ................ 340/407.2 |
| 2011/0260843 | A1 | 10/2011 | Woo et al. |

FOREIGN PATENT DOCUMENTS

| KR | 10-2002-0037771 | 5/2002 |
| KR | 10-2009-0088020 | 8/2009 |

OTHER PUBLICATIONS

Korean Office Action dated Apr. 25, 2012 issued in related Korean Patent Application No. 10-2011-0032490.
Office Action issued on Nov. 11, 2013 in copending U.S. Appl. No. 13/064,870.
U.S. Appl. No. 13/064,870, filed Apr. 21, 2011, Ki Suk Woo et al., Samsung Electro-Mechanics Co., Ltd.

* cited by examiner

*Primary Examiner* — Daniel Wu
*Assistant Examiner* — Son M Tang

(57) ABSTRACT

There is provided a lightweight, slim and compact haptic feedback device due to an actuator module constituted of a piezoelectric element and a vibration plate, and an electronic device having the same. The haptic feedback device includes a haptic device receiving contact pressure applied thereto, and an actuator module being in contact with a lower surface of the haptic device and excited according to variations in contact pressure with the haptic device to thereby generate vibrations.

18 Claims, 5 Drawing Sheets

HAPTIC FEEDBACK DEVICE AND ELECTRONIC DEVICE

CROSS-REFERENCE TO RELATED APPLICATIONS

This application claims the priority of Korean Patent Application No. 10-2010-0037519 filed on Apr. 22, 2010, in the Korean Intellectual Property Office, the disclosure of which is incorporated herein by reference.

BACKGROUND OF THE INVENTION

1. Field of the Invention

The present invention relates to a haptic feedback device and an electronic device, and more particularly, to a lightweight, slim and compact haptic feedback device due to an actuator module constituted of a piezoelectric element and a vibration plate, and an electronic device having the same.

2. Description of the Related Art

Recently, the use of touch-type devices allowing for an inputting operation in electronic devices (or home appliances) through a touch (contact) operation has become generalized according to the demands of users who desire to use electronic appliances in a simpler manner.

Currently, a haptic feedback device follows the concept of providing an intuitive user interface experience and diversifying possible types of contact feedback, in addition to facilitating the concept of performing an inputting operation through a touch.

The haptic feedback device has many advantages: It can save space, accomplish an improvement in manipulation and simplicity, allow for a simple change in specification, have a high level of user recognition, and have good interworkability with IT devices.

With such advantages, the haptic feedback device is commonly employed in electronic devices used in home computers, traffic note issuing devices, public information services, medical equipment, mobile communications devices, and the like.

In general, the related art electronic device uses a vibration motor to implement a haptic function. The vibration motor was devised to vibrate the entire electronic device body, so, in order to increase vibration force, body mass must be increased.

Accordingly, a haptic feedback device and an electronic device having the same have a problem of an increase in volume.

SUMMARY OF THE INVENTION

An aspect of the present invention provides a lightweight, slim and compact haptic feedback device due to an actuator module constituted of a piezoelectric element and a vibration plate and an electronic device having the same.

According to an aspect of the present invention, there is provided a haptic feedback device including a haptic device receiving contact pressure applied thereto, and an actuator module being in contact with a lower surface of the haptic device and excited according to variations in contact pressure with the haptic device to generate vibrations.

The actuator module may be disposed at a central portion of the haptic device.

The actuator module may be disposed at a central portion of an edge portion in a lengthwise direction of the haptic device.

The haptic device may include a touch panel receiving a user contact inputted thereto.

The haptic device may further include a display panel being in contact with a lower surface of the touch panel and providing an image according to the user contact with the touch panel.

The haptic device and the actuator module may have a buffer layer provided therebetween.

The actuator module may include at least one piezoelectric element generating vibrations, and at least one vibration plate having the at least one piezoelectric element mounted thereon and transferring the vibrations of the at least one piezoelectric element to the haptic device.

The at least one vibration plate may include a body portion having a predetermined length, and bent portions individually bent at both ends of the body portion to extend towards the body portion in a lengthwise direction thereof.

The at least one vibration plate further comprises a plate spring portion provided by a slit formed between the body portion and the bent portion.

The at least one vibration plate may further include a damper in a space between the body portion and the bent portion, the damper suppressing vibrations of the at least one vibration plate.

According to another aspect of the present invention, there is provided an electronic device including: a case having an internal space formed therein; a haptic device accommodated to be disposed within the case; and an actuator module being in contact with a lower surface of the haptic device and excited according to variations in contact pressure with the haptic device to generate vibrations.

According to another aspect of the present invention, there is provided an electronic device including: a case having an internal space formed therein; a haptic device accommodated to be disposed within the case; and an actuator module being in contact with an inner surface of the haptic device, being excited according to variations in contact pressure with the haptic device, and including at least one piezoelectric element and at least one vibration plate having the at least one piezoelectric element mounted thereon and transferring vibrations of the at least one piezoelectric element to the case.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art.

Figure 1:
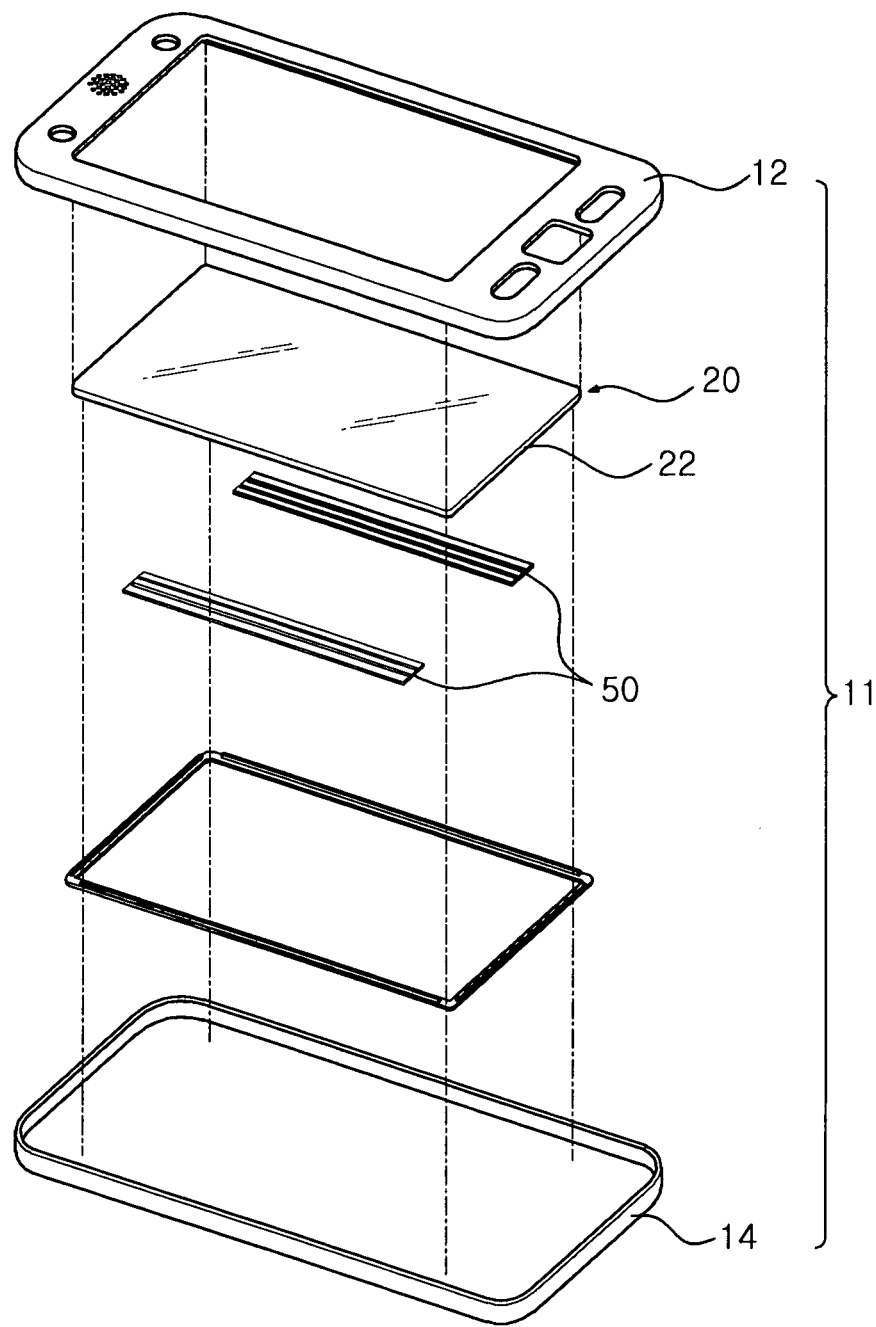
FIG. 1 is an exploded perspective view schematically illustrating an electronic device according to an exemplary embodiment of the present invention.
Figure 2:
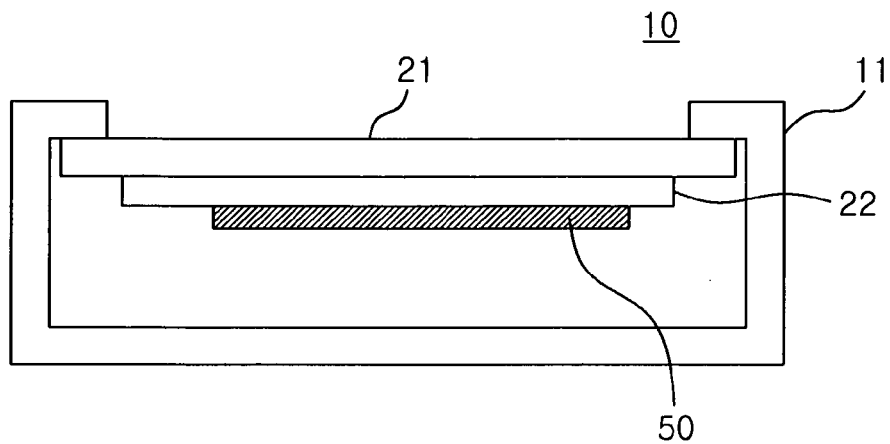
FIG. 2 is an internal cross-sectional view schematically illustrating an electronic device according to an exemplary embodiment of the present invention.
Figure 3A:
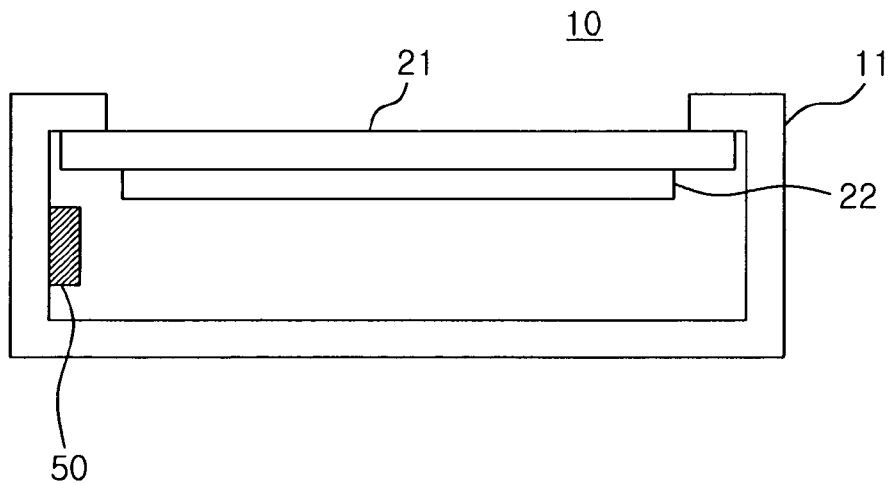
FIGS. 3A and 3B are internal cross-sectional views schematically illustrating an electronic device according to another exemplary embodiment of the present invention.
Figure 3B:
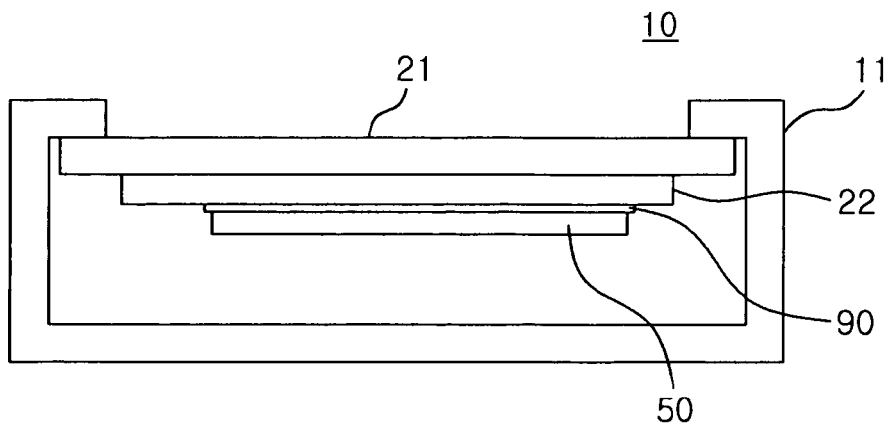

FIG. 1 is an exploded perspective view schematically illustrating an electronic device according to an exemplary embodiment of the present invention. FIG. 2 is an internal cross-sectional view schematically illustrating an electronic device according to an exemplary embodiment of the present invention. FIGS. 3A and 3B are internal cross-sectional views schematically illustrating an electronic device according to another exemplary embodiment of the present invention.

In the following description, a mobile communications terminal 10 will be taken as an electronic device according to an exemplary embodiment of the present invention, but without being limited thereto, the electronic device may be also applicable to a general haptic device generating a change in vibration according to a user contact with devices such as various OA devices, medical equipment, mobile communications devices, traffic note issuing device, and the like.

The mobile communications terminal 10 as an example of an electronic device will now be described in detail.

With reference to FIGS. 1 through 3B, the mobile communications terminal 10, which is an electronic device according to an exemplary embodiment of the present invention, may include a case 11, a haptic device 20, and an actuator module 50.

The case 11 may include an upper case 12 and a lower case 14. The upper case 12 and the lower case 14 may be coupled to form an internal space therebetween.

A display panel 22 serving as the haptic device 20 may be included in the internal space.

Here, the haptic device 20, a mechanism requiring vibration, is an internal element of the mobile communications terminal 10 that requires a reaction upon external contact pressure.

Besides the display panel 22 of the mobile communications terminal 10, the haptic device 20 may also be an input device, an OA device, a vending machine, a bed, a card, a driving device, a ticket, or the like.

In the mobile communications terminal 10 that is the electronic device according to the present embodiment, the display panel 22 providing an image is employed as the haptic device 20. Namely, when contact pressure is changed according to a contact applied to the display panel 22, the display panel 22 reacts haptically to the contact.

In order to allow the display panel 22 to react haptically, the actuator module 50 must generate vibrations.

The actuator module 50 may provide vibrations required for haptic reaction. Herein, the haptic device 20 may be the display panel as shown in FIG. 1, or the display panel as shown in FIG. 2. The display panel 22 of FIG. 2 may be in contact with a lower surface of a touch panel 21, to which the user contact is inputted, and display an image according to the user contact.

The actuator module 50 may be in contact with a lower surface of the haptic device 20 as shown in FIG. 2 or in contact with an inner surface of the case 11 as shown in FIG. 3A.

As shown in FIG. 3B, a buffer layer 90 may be formed between the haptic device 20 and the actuator module 50 to increase insulation.

As shown in FIG. 1, two actuator modules 50 may be formed at edge portions of the haptic device 20 in a lengthwise direction thereof. As shown in FIG. 2, at least one actuator modules 50 may be formed at a central portion of the haptic device 20 in a widthwise or lengthwise direction thereof.

FIGS. 4A, 4B, 5A, 5B and 6 are schematic perspective views illustrating an actuator module employed in an electronic device according to exemplary embodiments of the present invention.

Figure 4A:
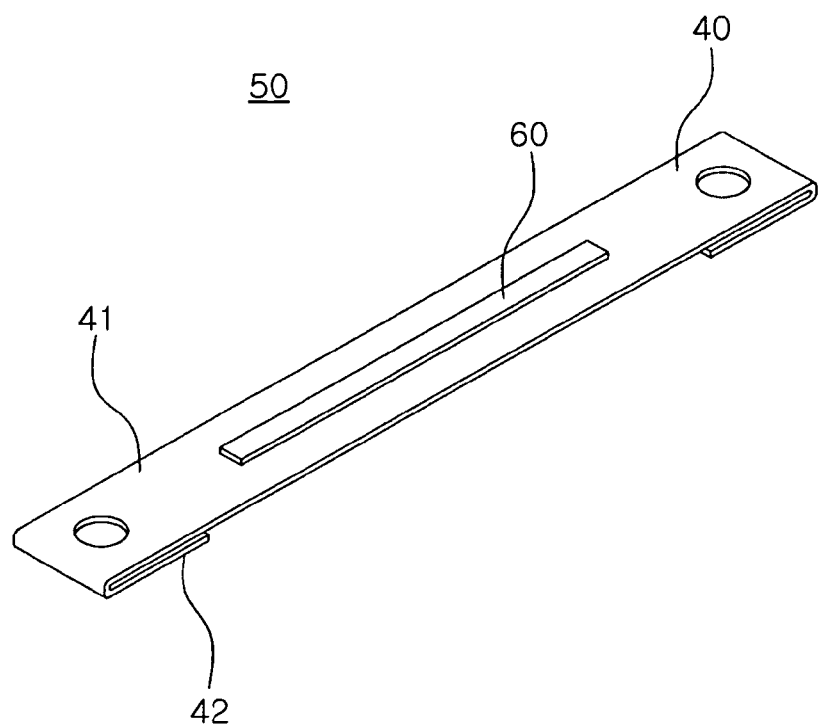
FIGS. 4A, 4B, 5A, 5B and 6 are perspective views schematically illustrating an actuator module employed in an electronic device according to exemplary embodiments of the present invention.
Figure 4B:
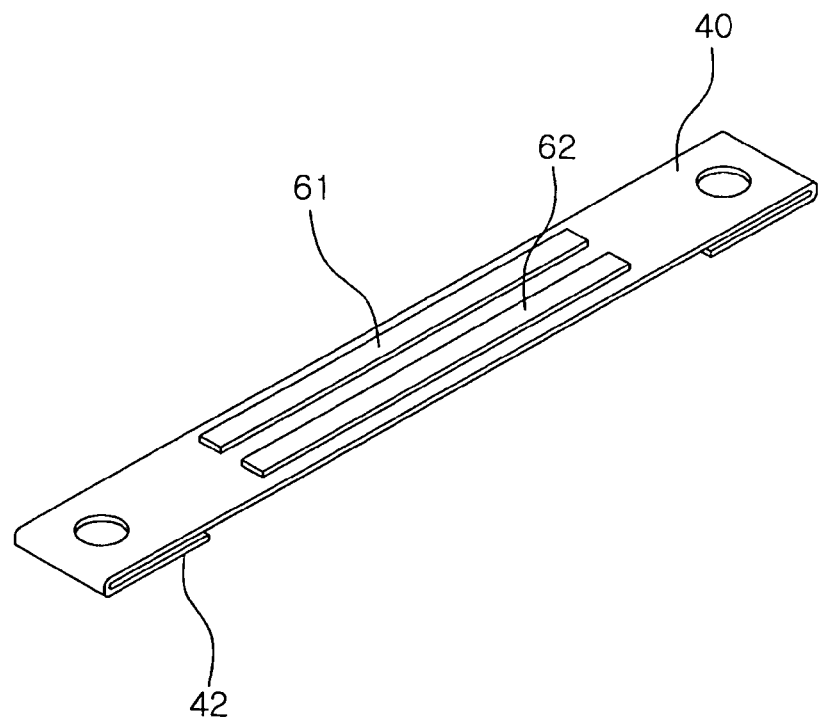
Figure 5A:
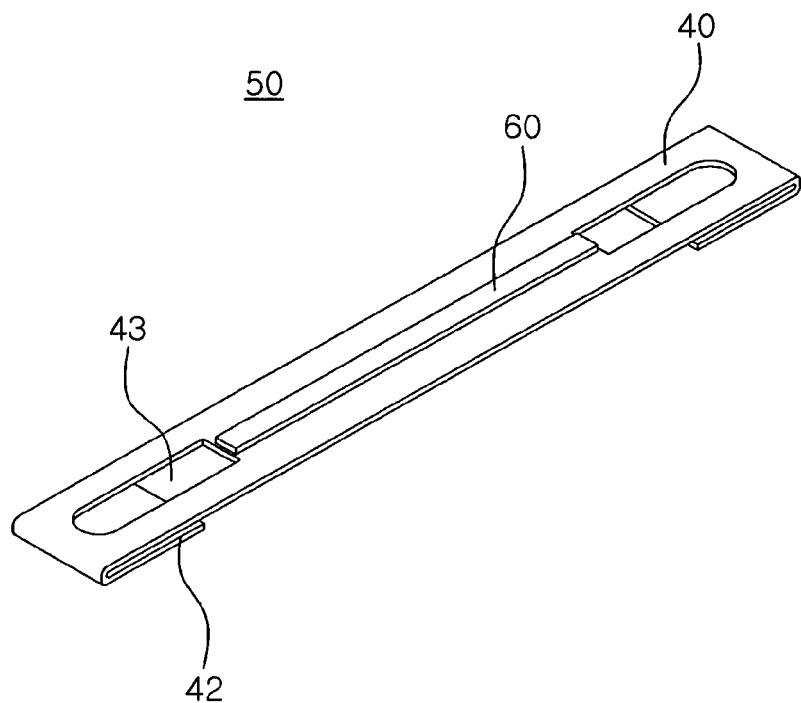
Figure 5B:
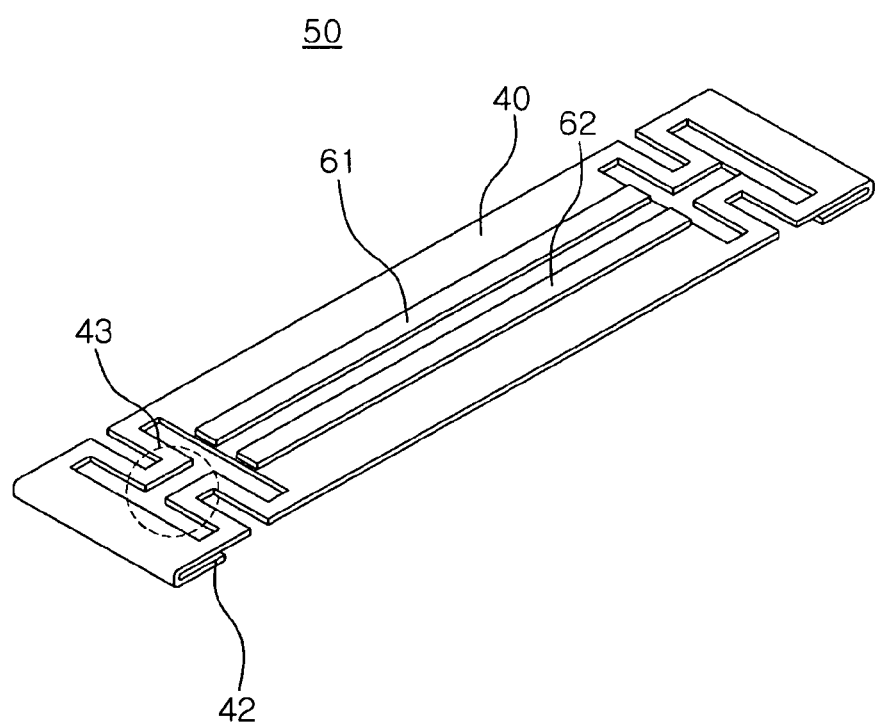

As shown in FIG. 4A, the actuator module 50 may include a vibration plate 40 having a predetermined length and transferring vibrations to the haptic device 20, and a piezoelectric element 60 being in contact with a surface of the vibration plate 40 in a lengthwise direction thereof and varying its volume according to electrical signal to thereby allow the vibration plate 40 to vibrate. As shown in FIG. 4B, at least two piezoelectric elements 61 and 62 may be formed in the lengthwise direction of the vibration plate 40. The vibration plate 40 may have a body portion 41 having a predetermined length and bent portions 42 extending from both ends of the body portion 41 and being bent to face each other in a lengthwise direction of the body portion 41. As shown in FIGS. 5A and 5B, a plate spring portion 43 may be formed through a slit in which a portion of the vibration plate 40 is open between the body portion 41 and the bent portion 42. This reduces rigidity so that a resonant frequency may be reduced. That is, the resonant frequency may be varied by forming the plate spring portion 43 on the vibration plate 40.

The vibration principle of a vibration plate by a piezoelectric element is that when voltage is applied to the piezoelectric element, tension-compression is generated to thereby vary the volume of the piezoelectric element, and the vibration plate is bent upwardly and downwardly according to the volume variation to thereby generate vibrations.

Vibration force may be expressed by Equation 1:

$$G = \frac{-m \times X \times \omega^2}{M} \qquad \text{Equation 1}$$

Herein, G is vibration force; m is mass of an actuator; x is displacement of the actuator; w is driving frequency; and M is overall mass of the actuator module.

Figure 7:
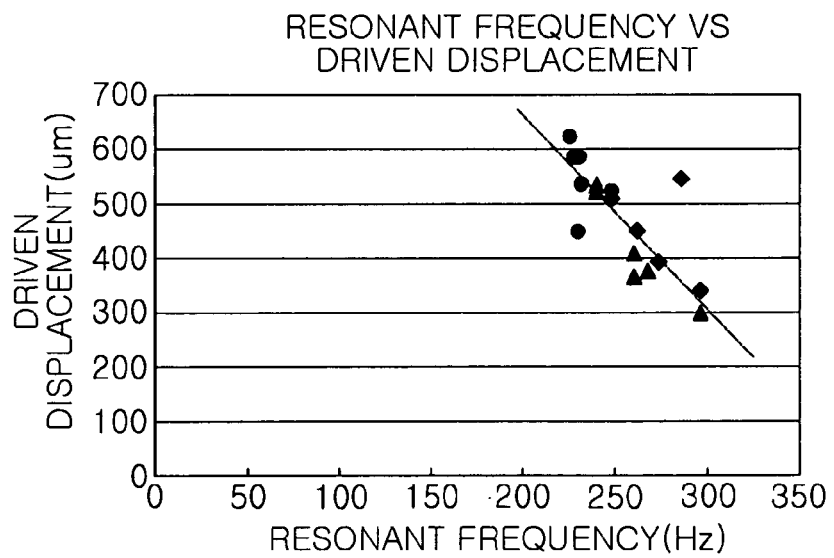
FIGS. 7 and 8 are graphs illustrating the operational characteristics of an actuator module employed in an electronic device according to an exemplary embodiment of the present invention.
Figure 8:
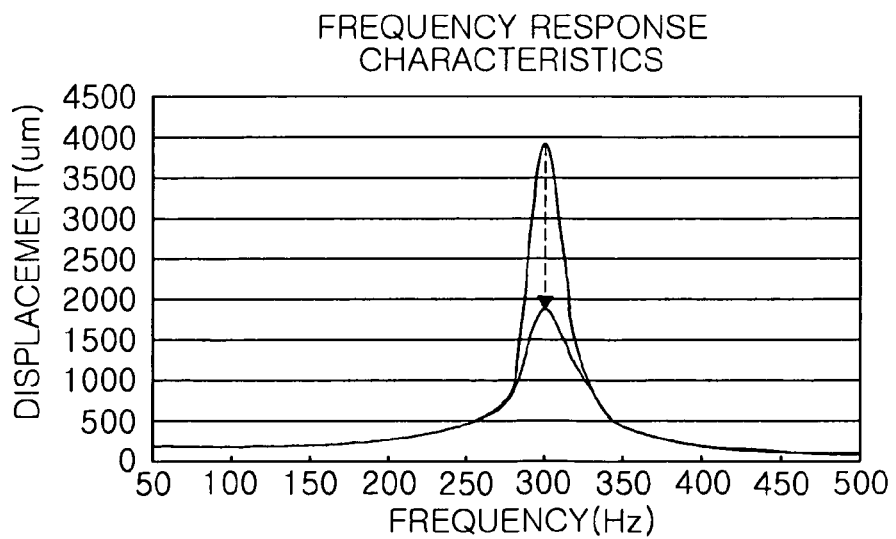

FIGS. 7 and 8 are graphs illustrating the operational characteristics of an actuator module employed in an electronic device according to an exemplary embodiment of the present invention.

With reference to FIG. 7, driven displacement is in inverse proportion to resonant frequency. That is, as shown in FIGS. 5A and 53, a portion of the vibration plate 40 is open to form the plate spring portion 43 therein, so that rigidity decreases and resonant frequency may be accordingly reduced.

Figure 6:
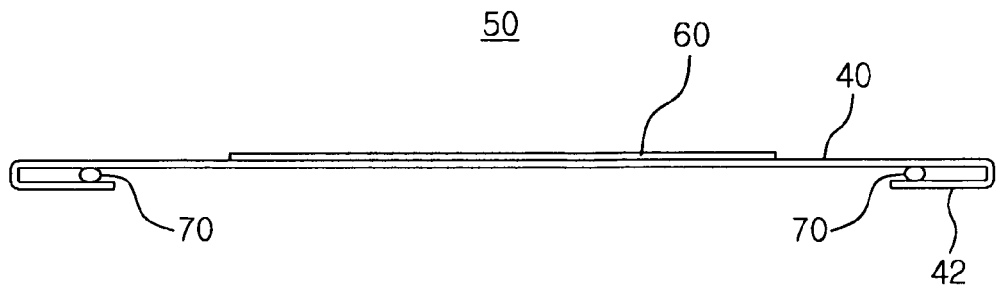

Meanwhile, as shown in FIG. 6, a damper 70 may be formed in a space between the body portion 41 and the bent portion 42 of the vibration plate 40.

In order to maximize vibration displacement, the vibration plate 40 is driven by resonant frequency. This increases the displacement of the vibration plate 40, but a system using the vibration plate 40 may become unstable or haptic reaction may not be transferred to a user immediately. Accordingly, the damper 70 is formed in a space between the body portion 41 and the bent portion 42 of the vibration plate 40, so that the displacement of the vibration plate 40 at the same resonant frequency may be adjusted as represented by an arrow of FIG. 8.

As described above, an actuator module may be constituted of a vibration plate and a piezoelectric element, rather than the use of a vibration motor, to thereby make a haptic feedback device slim, and the actuator module may be provided to be in direct contact with a lower surface of a haptic device or provided on an inner surface of an electronic device, thereby reducing the size of the electronic device and increasing the internal space utilization of the electronic device. In this manner, the electronic device becomes lightweight, slim and compact. Furthermore, a portion of the vibration plate is changed to be a plate spring portion so that resonant frequency may be varied, and a damper is formed in a space between a body portion and a bent portion of the vibration plate so that the displacement of the vibration plate may be adjusted.

As set forth above, according to exemplary embodiments of the invention, a haptic feedback device becomes slim by allowing an actuator module to directly contact a lower surface of a haptic device or to be constituted of a vibration plate and a piezoelectric element, whereby an electronic device using the haptic feedback device, when compared with the use of a vibration motor, can reduce its size, increase its internal space utilization, and be lightweight, slim and compact.

While the present invention has been shown and described in connection with the exemplary embodiments, it will be apparent to those skilled in the art that modifications and variations can be made without departing from the spirit and scope of the invention as defined by the appended claims.

What is claimed is:

1. A haptic feedback device comprising:
   a haptic device receiving contact pressure applied thereto; and
   an actuator module being in contact with a lower surface of the haptic device and excited according to variations in contact pressure with the haptic device to generate vibrations,
   wherein the actuator module comprises:
      at least one piezoelectric element generating vibrations; and
      at least one vibration plate having the at least one piezoelectric element mounted thereon and transferring the vibrations of the at least one piezoelectric element to the haptic device,
   wherein the at least one vibration plate comprises:
      a body portion having a predetermined length; and
      bent portions individually bent at both ends of the body portion to extend towards the body portion in a lengthwise direction thereof, and
   wherein the at least one vibration plate further comprises a damper in a space between the body portion and the bent portion, the damper suppressing vibrations of the at least one vibration plate.

2. The haptic feedback device of claim 1, wherein the actuator module is disposed at a central portion of the haptic device.

3. The haptic feedback device of claim 1, wherein the actuator module is disposed at a central portion of an edge portion in a lengthwise direction of the haptic device.

4. The haptic feedback device of claim 1, wherein the haptic device comprises a touch panel receiving a user contact inputted thereto.

5. The haptic feedback device of claim 4, wherein the haptic device further comprises a display panel being in contact with a lower surface of the touch panel and providing an image according to the user contact with the touch panel.

6. The haptic feedback device of claim 1, wherein the haptic device and the actuator module have a buffer layer provided therebetween.

7. A haptic feedback device comprising:
   a haptic device receiving contact pressure applied thereto; and
   an actuator module being in contact with a lower surface of the haptic device and excited according to variations in contact pressure with the haptic device to generate vibrations,
   wherein the actuator module comprises:
      at least one piezoelectric element generating vibrations; and
      at least one vibration plate having the at least one piezoelectric element mounted thereon and transferring the vibrations of the at least one piezoelectric element to the haptic device,
   wherein the at least one vibration plate comprises:
      a body portion having a predetermined length; and
      bent portions individually bent at both ends of the body portion to extend towards the body portion in a lengthwise direction thereof, and
   wherein the at least one vibration plate further comprises a plate spring portion provided by a slit formed between the body portion and the bent portion.

8. An electronic device comprising:
   a case having an internal space formed therein;
   a haptic device accommodated to be disposed within the case; and
   an actuator module being in contact with a lower surface of the haptic device and excited according to variations in contact pressure with the haptic device to generate vibrations,
   wherein the actuator module comprises:
      at least one piezoelectric element generating vibrations; and
      at least one vibration plate having the at least one piezoelectric element mounted thereon and transferring the vibrations of the at least one piezoelectric element to the haptic device,
   wherein the at least one vibration plate comprises:
      a body portion having a predetermined length; and
      bent portions individually bent at both ends of the body portion to extend towards the body portion in a lengthwise direction thereof, and
   wherein the at least one vibration plate further comprises a damper in a space between the body portion and the bent portion, the damper suppressing vibrations of the at least one vibration plate.

9. The electronic device of claim 8, wherein the actuator module is disposed at a central portion of the haptic device.

10. The electronic device of claim 8, wherein the actuator module is disposed at a central portion of an edge portion in a lengthwise direction of the haptic device.

11. The electronic device of claim 8, wherein the haptic device comprises a touch panel receiving a user contact inputted thereto.

12. The electronic device of claim 11, wherein the haptic device further comprises a display panel being in contact with a lower surface of the touch panel and providing an image according to the user contact with the touch panel.

13. The electronic device of claim 8, wherein the haptic device and the actuator module have a buffer layer provided therebetween.

14. An electronic device comprising:
a case having an internal space formed therein;
a haptic device accommodated to be disposed within the case; and
an actuator module being in contact with a lower surface of the haptic device and excited according to variations in contact pressure with the haptic device to generate vibrations,
wherein the actuator module comprises:
at least one piezoelectric element generating vibrations; and
at least one vibration plate having the at least one piezoelectric element mounted thereon and transferring the vibrations of the at least one piezoelectric element to the haptic device,
wherein the at least one vibration plate comprises:
a body portion having a predetermined length; and
bent portions individually bent at both ends of the body portion to extend towards the body portion in a lengthwise direction thereof, and
wherein the at least one vibration plate further comprises a plate spring portion provided by a slit formed between the body portion and the bent portion.

15. An electronic device comprising:
a case having an internal space formed therein;
a haptic device accommodated to be disposed within the case; and
an actuator module being in contact with an inner surface of the haptic device, being excited according to variations in contact pressure with the haptic device, and including at least one piezoelectric element and at least one vibration plate having the at least one piezoelectric element mounted thereon and transferring vibrations of the at least one piezoelectric element to the case,
wherein the at least one vibration plate comprises:
a body portion having a predetermined length; and
bent portions individually bent at both ends of the body portion to extend towards the body portion in a lengthwise direction thereof, and
wherein the at least one vibration plate further comprises a damper in a space between the body portion and the bent portion, the damper suppressing vibrations of the at least one vibration plate.

16. The electronic device of claim 15, wherein the haptic device comprises a touch panel receiving a user contact inputted thereto.

17. The electronic device of claim 16, wherein the haptic device further comprises a display panel being in contact with a lower surface of the touch panel and providing an image according to the user contact with the touch panel.

18. An electronic device comprising:
a case having an internal space formed therein;
a haptic device accommodated to be disposed within the case; and
an actuator module being in contact with an inner surface of the haptic device, being excited according to variations in contact pressure with the haptic device, and including at least one piezoelectric element and at least one vibration plate having the at least one piezoelectric element mounted thereon and transferring vibrations of the at least one piezoelectric element to the case,
wherein the at least one vibration plate comprises:
a body portion having a predetermined length; and
bent portions individually bent at both ends of the body portion to extend towards the body portion in a lengthwise direction thereof, and
wherein the at least one vibration plate further comprises a plate spring portion provided by a slit formed between the body portion and the bent portion.

\* \* \* \* \*